(12) United States Patent
Sugawara

(10) Patent No.: US 11,276,404 B2
(45) Date of Patent: Mar. 15, 2022

(54) SPEECH RECOGNITION DEVICE, SPEECH RECOGNITION METHOD, NON-TRANSITORY COMPUTER-READABLE MEDIUM STORING SPEECH RECOGNITION PROGRAM

(71) Applicants: TOYOTA JIDOSHA KABUSHIKI KAISHA, Toyota (JP); DENSO CORPORATION, Kariya (JP)

(72) Inventor: Yoshihiko Sugawara, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 16/567,301

(22) Filed: Sep. 11, 2019

(65) Prior Publication Data

US 2020/0098371 A1  Mar. 26, 2020

(30) Foreign Application Priority Data

Sep. 25, 2018 (JP) .............................. JP2018-179407

(51) Int. Cl.
  *G10L 15/26* (2006.01)
  *G06F 3/16* (2006.01)
  *G10L 15/22* (2006.01)

(52) U.S. Cl.
  CPC ............... *G10L 15/26* (2013.01); *G06F 3/165* (2013.01); *G10L 2015/223* (2013.01)

(58) Field of Classification Search
  CPC ......... G01C 21/26; G06F 3/165; G06F 17/16; G10L 15/00; G10L 15/26; G10L 15/28; G10L 2015/223; G10L 25/21; H04N 21/42204; H04R 25/505; H04K 3/825

USPC ............ 345/156, 626; 370/352; 381/17, 58; 455/563; 704/211, 231, 233, 275, 201, 704/226, 260; 705/44, 77; 380/252; 379/93.17; 709/204
See application file for complete search history.

(56) References Cited

U.S. PATENT DOCUMENTS

| | | | | |
|---|---|---|---|---|
| 5,687,221 A | * | 11/1997 | Oheda | H04M 11/06 379/100.01 |
| 6,963,759 B1 | * | 11/2005 | Gerson | 455/414.1 |
| 8,983,845 B1 | * | 3/2015 | Kristjansson | H04L 41/0803 704/275 |
| 9,154,848 B2 | * | 10/2015 | Ouchi | H04N 21/4325 |
| 2001/0044786 A1 | * | 11/2001 | Ishibashi | G06Q 20/105 705/77 |
| 2003/0040903 A1 | * | 2/2003 | Gerson | H04M 3/493 704/211 |
| 2005/0060368 A1 | * | 3/2005 | Wang | H04L 41/0893 709/204 |

(Continued)

FOREIGN PATENT DOCUMENTS

| | | |
|---|---|---|
| JP | 2006-317556 A | 11/2006 |
| JP | 2007-006363 A | 1/2007 |

(Continued)

*Primary Examiner* — Gerald Gauthier
(74) *Attorney, Agent, or Firm* — Oliff PLC

(57) ABSTRACT

A speech recognition device of the present disclosure recognizes an uttered speech of a user, and includes a controller configured to control output of any disturbance sound according to whether uttered content requested to the user is content desired not to be heard by a third party, and stop the output of the disturbance sound in response to end of an utterance of the user.

7 Claims, 3 Drawing Sheets

(56) References Cited

U.S. PATENT DOCUMENTS

| | | | |
|---|---|---|---|
| 2006/0028488 A1* | 2/2006 | Gabay | H04L 65/607 345/626 |
| 2006/0109983 A1* | 5/2006 | Young | H04K 3/84 380/252 |
| 2007/0083361 A1* | 4/2007 | Ferencz | H04K 1/06 704/201 |
| 2007/0208806 A1* | 9/2007 | Mordecai | G06Q 10/10 709/204 |
| 2008/0235024 A1* | 9/2008 | Goldberg | G10L 13/00 704/260 |
| 2009/0006096 A1* | 1/2009 | Li | G10L 13/08 704/260 |
| 2012/0316869 A1* | 12/2012 | Xiang | H04K 3/825 704/226 |
| 2013/0185061 A1* | 7/2013 | Arvanaghi | H04K 3/43 704/201 |
| 2013/0231929 A1* | 9/2013 | Komeji | G10L 15/20 704/233 |
| 2013/0322634 A1* | 12/2013 | Bennett | G10L 21/00 381/17 |
| 2014/0136411 A1* | 5/2014 | Cho | G06Q 20/327 705/44 |
| 2015/0117439 A1* | 4/2015 | Efrati | H04M 7/006 370/352 |
| 2015/0230022 A1* | 8/2015 | Sakai | H04R 1/1041 381/58 |
| 2016/0252963 A1* | 9/2016 | Elkins | G06F 1/1694 345/156 |
| 2016/0253149 A1* | 9/2016 | Iyer | G06F 1/1694 704/275 |
| 2016/0275932 A1* | 9/2016 | Hata | G10K 11/1754 |
| 2016/0277834 A1* | 9/2016 | Hata | H04K 3/41 |
| 2017/0243580 A1* | 8/2017 | Furumoto | G10L 15/22 |
| 2020/0098371 A1* | 3/2020 | Sugawara | H04K 3/45 |
| 2020/0118557 A1* | 4/2020 | Lesso | G10L 15/20 |
| 2021/0150315 A1* | 5/2021 | Dang | G06N 20/00 |
| 2021/0312938 A1* | 10/2021 | Yun | G10L 15/20 |

FOREIGN PATENT DOCUMENTS

| | | |
|---|---|---|
| JP | 4765394 B2 | 9/2011 |
| JP | 2013-019803 A | 1/2013 |

* cited by examiner

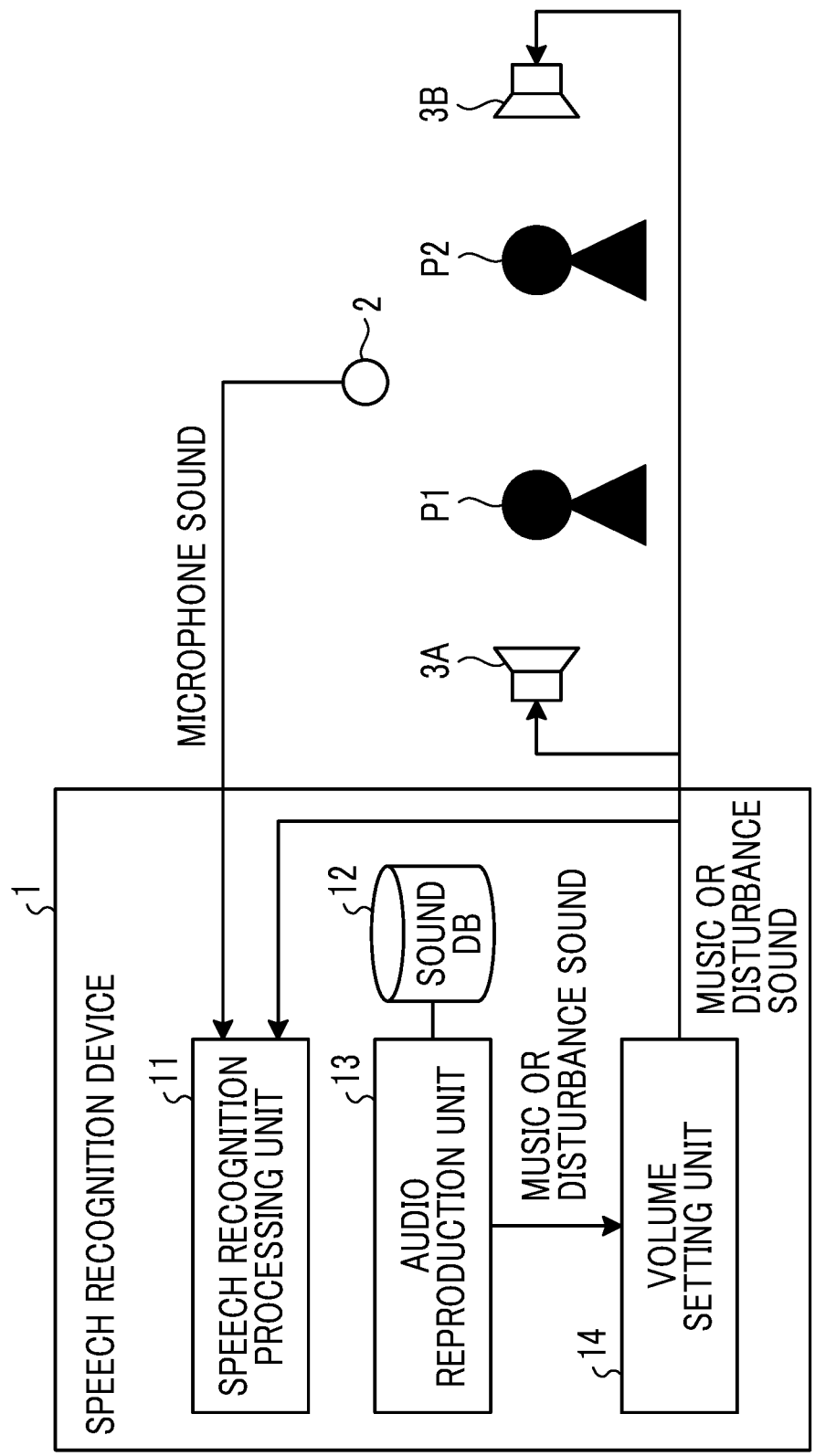

SPEECH RECOGNITION DEVICE, SPEECH RECOGNITION METHOD, NON-TRANSITORY COMPUTER-READABLE MEDIUM STORING SPEECH RECOGNITION PROGRAM

INCORPORATION BY REFERENCE

The disclosure of Japanese Patent Application No. 2018-179407 filed on Sep. 25, 2018 including the specification, drawings and abstract is incorporated herein by reference in its entirety.

BACKGROUND

1. Technical Field

The present disclosure relates to a speech recognition device that recognizes an uttered speech of a user, a speech recognition method, and a non-transitory computer-readable medium storing a speech recognition program.

2. Description of Related Art

Japanese Unexamined Patent Application Publication No. 2013-019803 (JP 2013-019803 A) describes a voice dialogue device that adjusts volume of music according to a calculation result of an utterance volume of a user while starting output of music or maintaining a music output state, in order to guide the utterance volume of the user to a desired level.

SUMMARY

A user may not desire a third party such as a passenger of a vehicle to hear uttered content in a situation in which a speech recognition device is used. However, in the voice dialogue device described in JP 2013-019803 A, uttered content of the user is likely to be heard by a third party because music is not reproduced with volume at a level at which the third party hearing the uttered content of the user is disturbed.

The present disclosure provides a speech recognition device, a speech recognition method, and a non-transitory computer-readable medium storing a speech recognition program capable of suppressing uttered content of the user being heard by a third party.

A first aspect of the present disclosure relates to a speech recognition device that recognizes an uttered speech of a user. The speech recognition device includes a controller configured to control output of any disturbance sound according to whether uttered content requested to the user is content desired not to be heard by a third party, and stop the output of the disturbance sound in response to end of an utterance of the user.

In the speech recognition device according to the first aspect of the present disclosure, the controller may be configured to control output volume of music to a level at which hearing the uttered content is disturbed when the music is being output. Accordingly, it is possible to suppress the uttered content of the user being heard by the third party.

In the speech recognition device according to the first aspect of the present disclosure, the controller may be configured to determine whether the uttered content requested to the user is the content desired not to be heard by the third party based on a scene or situation in which the utterance is requested to the user and presence or absence of a request signal from the user. Accordingly, it is possible to accurately determine whether the uttered content requested to the user is the content desired not to be heard by the third party.

In the speech recognition device according to the first aspect of the present disclosure, the controller may be configured to remove the disturbance sound from speech data acquired via a speech input device to recognize an uttered speech of the user. Accordingly, it is possible to accurately recognize the uttered speech of the user even in a state in which the disturbance sound is being output.

A second aspect of the present disclosure relates to a speech recognition method of recognizing an uttered speech of a user. The speech recognition method includes controlling output of any disturbance sound according to whether uttered content requested to the user is content desired not to be heard by a third party, and stopping the output of the disturbance sound in response to end of an utterance of the user.

The speech recognition method according to the second aspect of the present disclosure may further include determining whether the uttered content requested to the user is the content desired not to be heard by the third party, controlling output volume of music to a level at which hearing the uttered content is disturbed when the uttered content is the content desired not to be heard by the third party and the music is being output, and reproducing the disturbance sound when the uttered content is the content desired not to be heard by the third party and the music is not being output.

A third aspect of the present disclosure relates to a non-transitory computer-readable medium storing a speech recognition program for causing a computer to execute a process of recognizing an uttered speech of a user. The process includes: controlling output of any disturbance sound according to whether uttered content requested to the user is content desired not to be heard by a third party, and stopping the output of the disturbance sound in response to end of the utterance of the user.

With the speech recognition device, the speech recognition method, and the non-transitory computer-readable medium storing a speech recognition program according to the aspects of the present disclosure, since the output of any disturbance sound is controlled according to whether the uttered content requested to the user is the content desired not to be heard by the third party, it is possible to suppress the uttered content of the user being heard by the third party.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a block diagram illustrating a configuration of a speech recognition device according to one embodiment of the present disclosure;

DETAILED DESCRIPTION OF EMBODIMENTS

Figure 2A:
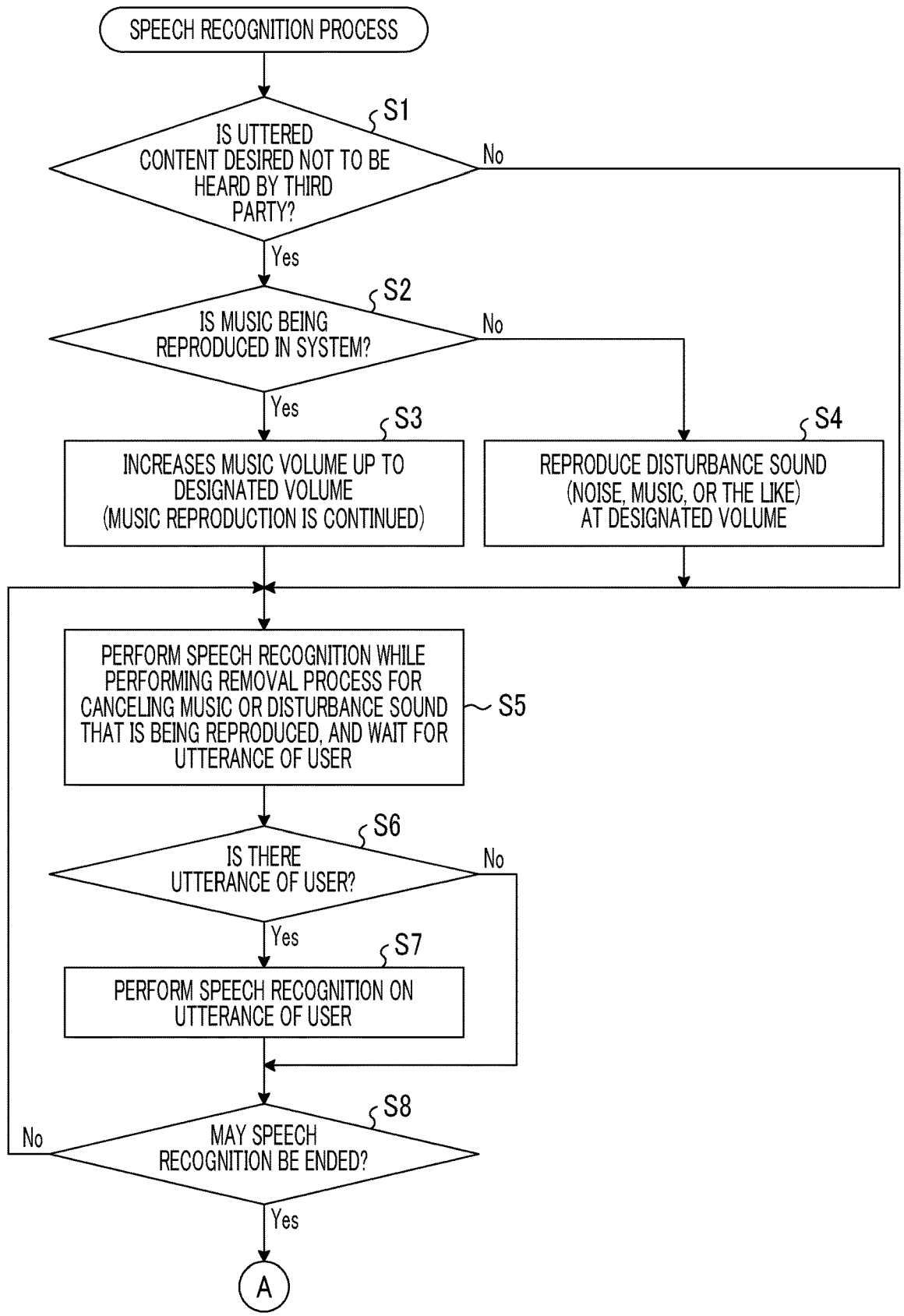
FIG. 2A is a flowchart illustrating a flow of a speech recognition process according to one embodiment of the present disclosure.

Hereinafter, a configuration and operation of a speech recognition device according to one embodiment of the present disclosure will be described with reference to the drawings.

Configuration of Speech Recognition Device

First, a configuration of a speech recognition device according to one embodiment of the present disclosure will be described with reference to FIG. 1.

FIG. 1 is a block diagram illustrating a configuration of a speech recognition device according to one embodiment of the present disclosure. As illustrated in FIG. 1, a speech recognition device 1 according to one embodiment of the present disclosure is configured as a general-purpose information processing device such as a workstation including a processor such as a central processing unit (CPU), a digital signal processor (DSP), or a field programmable gate array (FPGA), and a storage unit such as a random access memory (RAM) and a read only memory (ROM), and includes a speech recognition processing unit 11, a sound database (sound DB) 12, an audio reproduction unit 13, and volume setting unit 14. Functions of the speech recognition processing unit 11, the audio reproduction unit 13, and the volume setting unit 14 are realized by the processor executing a computer program stored in the storage unit. The speech recognition processing unit 11, the audio reproduction unit 13, and the volume setting unit 14 may function as a controller.

The speech recognition processing unit 11 acquires uttered speech of a user P1 via a speech input device 2 such as a microphone, and recognizes content of the acquired uttered speech. As will be described in detail below, in the present embodiment, the speech recognition processing unit 11 removes data of music or disturbance sound from the speech (microphone sound) data acquired via the speech input device 2, and recognizes content of the uttered speech of the user P1 under an environment in which the music or disturbance sound is reproduced using speech data after a removal process.

The sound DB 12 stores data of music or a disturbance sound. Here, examples of the disturbance sound can include a dedicated speech suitable for disturbance of hearing the uttered content of the user P1 (for example, a noise sound music that is not offensive and has no silence), and music owned by the user.

The audio reproduction unit 13 acquires the data of the music or the disturbance sound from the sound DB 12, reproduces the acquired data and then outputs the acquired data that has been reproduced.

The volume setting unit 14 adjusts the volume of the music or the disturbance sound reproduced by the audio reproduction unit 13 and outputs the music or the disturbance sound from a speaker 3A installed near the user P1 or a speaker 3B installed near a third party (for example, a passenger of a vehicle) P2.

The computer program described above can be recorded in a computer-readable recording medium such as a CD-ROM, a flexible disc, a compact disc recordable (CD-R), and a digital versatile disc (DVD) and provided as a file in an installable format or an executable format. Further, the computer program described above may be stored in a computer connected to an electric communication line and provided by being downloaded via the electric communication line. Further, the computer program described above may be provided or distributed via the electric communication line.

The speech recognition device 1 having such a configuration executes the following speech recognition process, thereby suppressing the uttered content of the user P1 being heard by the third party P2. Hereinafter, an operation of the speech recognition device 1 at the time of execution of the speech recognition process will be described with reference to FIGS. 2A and 2B.

Speech Recognition Process

Figure 2B:
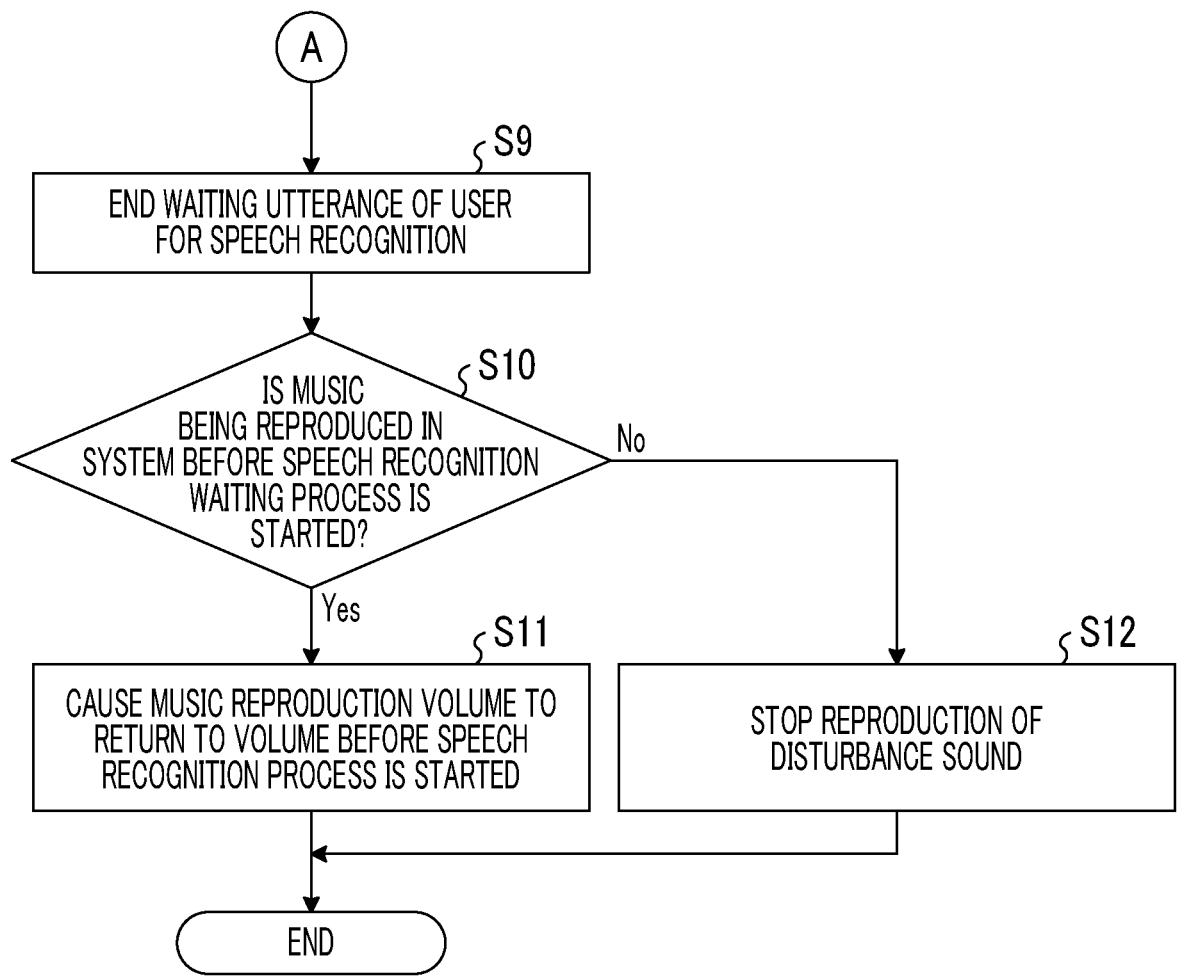
FIG. 2B is a flowchart illustrating a flow of a speech recognition process according to one embodiment of the present disclosure.

FIGS. 2A and 2B are a flowchart illustrating a flow of a speech recognition process according to one embodiment of the present disclosure. The flowchart illustrated in FIGS. 2A and 2B is started each time the speech recognition device 1 requests utterance to the user P1, and the speech recognition process proceeds to a process of step S1.

In the process of step S1, the speech recognition processing unit 11 determines whether uttered content requested to the user P1 (a content of an utterance that the user P1 is requested to provide) is content desired not to be heard by a third party P2. Specifically, the speech recognition processing unit 11 determines whether uttered content requested to the user P1 is content desired not to be heard by the third party P2 based on a scene or situation in which utterance is requested to the user P1 (for example, a case of recognizing that an answer that cannot be heard by others is requested to the user P1 in a situation in which a quiz in which all passengers in a vehicle participate is being conducted) and the presence or absence of a request signal from the user P1. As a result of the determination, when the uttered content requested to the user P1 is content desired not to be heard by the third party P2 (step S1: Yes), the speech recognition process in the speech recognition processing unit 11 proceeds to a process of step S2. On the other hand, when the uttered content requested to the user P1 is not content desired not to be heard by the third party P2 (step S1: No), the speech recognition process in the speech recognition processing unit 11 proceeds to a process of step S5.

It should be noted that the uttered content desired not to be heard by the third party P2 may be defined in advance according to content to be uttered (answered) requested to the user P1 by the speech recognition processing unit 11. The definition may be divided into a plurality of levels to indicate a degree at which the content cannot be heard, such as a destination to be set being defined as level 1, a name as level 1, an address as level 2, a telephone number as level 2, a bank account number as level 3, and an answer of a quiz as level 3, or may be binarized (may not be heard or may be heard). When the definition is divided into levels, a threshold value indicating that the content is desired not to be heard in the case of which level or more may be set for each user P1. In this case, when the user P1 is caused to utter content at a level exceeding the threshold value, the speech recognition device 1 performs control of hearing the uttered content and a disturbance sound directed to a third party. Further, when there is no third party P2, the speech recognition device 1 may automatically determine that the threshold value is invalidated (set to zero). Examples of a case in which there is no third party P2 can include a case in which a seating sensor determines that there is no passenger in seats other than a driver's seat, and a case in which a passenger other than a driver is not detected by an in-cabin camera.

In the process of step S2, the volume setting unit 14 determines whether the audio reproduction unit 13 is reproducing music. As a result of the determination, when the audio reproduction unit 13 is reproducing the music (step S2: Yes), the speech recognition process in the volume setting unit 14 proceeds to a process of step S3. On the other hand, when the audio reproduction unit 13 is not reproducing the music (step S2: No), the speech recognition process in the volume setting unit 14 proceeds to a process of step S4.

In the process of step S3, the volume setting unit 14 increases volume of the music output from the speaker 3B provided near the third party P2 up to volume at which the third party P2 cannot hear the uttered speech of the user P1 (music reproduction is continued). It should be noted that in this case, volume of an entire space in a vehicle cabin or the like in which there are the user P1 and the third party P2 or volume just around the user P1 may be increased. Further, not only simple volume adjustment is performed, but also an equalizer that makes it difficult for the uttered speech of the user P1 to be heard may be applied. Accordingly, the process of step S3 is completed, and the speech recognition process proceeds to a process of step S5.

In the process of step S4, the volume setting unit 14 controls the audio reproduction unit 13 so that the audio reproduction unit 13 reproduces the disturbance sound stored in the sound DB 12. The volume setting unit 14 controls the volume of the disturbance sound output from the speaker 3B provided near the third party P2 to volume at which the third party P2 cannot hear the uttered speech of the user P1. Accordingly, the process of step S4 is completed, and the speech recognition process proceeds to a process of step S5.

In the process of step S5, the speech recognition processing unit 11 performs speech recognition while performing the removal process of removing (canceling) the music or disturbance sound that is being reproduced from the speech data acquired via the speech input device 2, to wait for the utterance of the user P1. Accordingly, the process of step S5 is completed, and the speech recognition process proceeds to a process of step S6.

In the process of step S6, the speech recognition processing unit 11 determines whether there is an utterance of the user P1 based on a speech recognition result. As a result of the determination, when there is the utterance of the user P1 (step S6: Yes), the speech recognition process in the speech recognition processing unit 11 proceeds to a process of step S7. On the other hand, when there is no utterance of the user P1 (step S6: No), the speech recognition processing unit 11 causes the speech recognition process to proceed to a process of step S8.

In the process of step S7, the speech recognition processing unit 11 performs speech recognition on the uttered content of the user P1. Accordingly, the process of step S7 is completed, and the speech recognition process proceeds to a process of step S8.

In the process of step S8, the speech recognition processing unit 11 determines whether the speech recognition may be ended based on the uttered content of the user P1, the presence or absence of a request signal from the user P1, and the like. As a result of the determination, when the speech recognition may be ended (step S8: Yes), the speech recognition process in the speech recognition processing unit 11 proceeds to a process of step S9. On the other hand, when the speech recognition processing unit 11 may not end the speech recognition (step S8: No), the speech recognition process in the speech recognition processing unit 11 returns to the process of step S5.

In the process of step S9, the speech recognition processing unit 11 ends a process of waiting the utterance of the user P1. Accordingly, the process of step S9 is completed, and the speech recognition process proceeds to a process of step S10.

In the process of step S10, the volume setting unit 14 determines whether the audio reproduction unit 13 is reproducing the music before the process of waiting the utterance of the user P1 is started. As a result of the determination, when the audio reproduction unit 13 is reproducing music (step S10: Yes), the speech recognition process in the volume setting unit 14 proceeds to a process of step S11. On the other hand, when the audio reproduction unit 13 has not reproduced music (step S10: No), the speech recognition process in the volume setting unit 14 proceeds to a process of step S12.

In the process of step S11, the volume setting unit 14 causes a music reproduction volume to return to the volume before the speech recognition process is started. Accordingly, the process of step S11 is completed, and a series of speech recognition processes end.

In the process of step S12, the volume setting unit 14 controls the audio reproduction unit 13 to stop the reproduction of the disturbance sound. Accordingly, the process of step S12 is completed, and a series of speech recognition processes end.

As is apparent from the above description, in the speech recognition process according to one embodiment of the present disclosure, the speech recognition device 1 controls the output of the music or disturbance sound according to whether the uttered content requested to the user P1 is content desired not to be heard by the third party P2, and the output of the disturbance sound is stopped according to end of the utterance of the user P1. Therefore, it is possible to suppress the uttered content of the user P1 being heard by the third party P2.

Further, in the speech recognition process according to one embodiment of the present disclosure, when the speech recognition device 1 is reproducing the music, the speech recognition device 1 controls the volume of the music to a level at which hearing the uttered content of the user P1 is disturbed. Therefore, it is possible to suppress the uttered content of the user P1 being heard by the third party P2.

Further, in the speech recognition process according to one embodiment of the present disclosure, since the speech recognition device 1 determines whether the uttered content requested to the user P1 is content desired not to be heard by the third party P2 based on a scene or situation in which utterance is requested to the user P1 and the presence or absence of a request signal from the user, it is possible to accurately determine whether the uttered content requested to the user P1 is content desired not to be heard by the third party P2.

Further, in the speech recognition process according to one embodiment of the present disclosure, since the speech recognition device 1 recognizes the uttered speech of the user P1 by removing the disturbance sound from the speech data acquired via the speech input device 2, it is possible to accurately recognize the uttered speech of the user P1 even in a state in which the disturbance sound is being output.

Although the embodiment to which the disclosure of the present inventors has been applied has been described above, the present disclosure is not limited by the description and the drawings that form a part of the disclosure of the present disclosure according to the present embodiment. That is, other embodiments, examples, operation techniques, and the like that are implemented by those skilled in the art based on the present embodiment are all included in the scope of the present disclosure.

What is claimed is:

1. A speech recognition device that recognizes an uttered speech of a user, the speech recognition device comprising:

a controller configured to
  make a determination of whether requested content of an answer requested to the user is content desired not to be heard by a third party, wherein the determination is made prior to speech recognition of the uttered speech of the user,
  in response to determining that the requested content is the content desired not to be heard by the third party, cause a disturbance sound to be output such that the third party is prevented from hearing the uttered speech containing the requested content wherein the disturbance sound is caused to be output prior to the speech recognition of the uttered speech of the user, and
  in response to detecting an end of the uttered speech, cause output of the disturbance sound to be stopped.

2. The speech recognition device according to claim 1, wherein, in response to determining that the requested content is the content desired not to be heard by the third party and determining that music is currently being output, the controller is configured to control output volume of the music, to a level at which hearing the uttered speech is disturbed, without causing the disturbance sound to be output.

3. The speech recognition device according to claim 1, wherein the controller is configured to make the determination of whether the requested content of the answer requested to the user is the content desired not to be heard by the third party based on a scene or situation in which the requested content of the answer is requested to the user and presence or absence of a request signal from the user.

4. The speech recognition device according to claim 1, wherein the controller is configured to remove the disturbance sound from speech data acquired via a speech input device to recognize the uttered speech of the user.

5. A speech recognition method of recognizing an uttered speech of a user, the speech recognition method comprising:
  making a determination of whether requested content of an answer requested to the user is content desired not to be heard by a third party, wherein the determination is made prior to speech recognition of the uttered speech of the user;
  in response to determining that the requested content is the content desired not to be heard by the third party, causing a disturbance sound to be output such that the third party is prevented from hearing the uttered speech containing the requested content, wherein the disturbance sound is caused to be output prior to the speech recognition of the uttered speech of the user; and
  in response to detecting an end of the uttered speech, causing output of the disturbance sound to be stopped.

6. The speech recognition method according to claim 5, further comprising:
  in response to determining that the requested content is the content desired not to be heard by the third party and determining that music is currently being output, controlling output volume of the music, to a level at which hearing the uttered speech is disturbed, without causing the disturbance sound to be output; and
  in response to determining that the requested content is the content desired not to be heard by the third party and determining that the music is no longer being output, reproducing the disturbance sound.

7. A non-transitory computer-readable medium storing a speech recognition program for causing a computer to execute a process of recognizing an uttered speech of a user, the process comprising:
  making a determination of whether requested content of an answer requested to the user is content desired not to be heard by a third party, wherein the determination is made prior to speech recognition of the uttered speech of the user;
  in response to determining that the requested content is the content desired not to be heard by the third party, causing a disturbance sound to be output such that the third party is prevented from hearing the uttered speech containing the requested content, wherein the disturbance sound is caused to be output prior to the speech recognition of the uttered speech of the user; and
  in response to detecting an end of the uttered speech, causing output of the disturbance sound to be stopped.

* * * * *